United States Patent
Chang

(10) Patent No.: US 8,059,957 B2
(45) Date of Patent: Nov. 15, 2011

(54) CAMERA MODULE ARRAY FOR OBTAINING COMPOUND IMAGES

(75) Inventor: Jen-Tsorng Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 63 days.

(21) Appl. No.: 12/547,677

(22) Filed: Aug. 26, 2009

(65) Prior Publication Data
US 2010/0166410 A1 Jul. 1, 2010

(30) Foreign Application Priority Data
Dec. 27, 2008 (CN) .......................... 2008 1 0306595

(51) Int. Cl.
G03B 35/00 (2006.01)
(52) U.S. Cl. ....................................... 396/326
(58) Field of Classification Search .................. 396/326
See application file for complete search history.

(56) References Cited

U.S. PATENT DOCUMENTS

| 5,005,934 A * | 4/1991 | Curtiss .............................. 385/18 |
| 7,795,577 B2 * | 9/2010 | Olsen et al. .................... 250/239 |
| 2007/0295893 A1 | 12/2007 | Olsen et al. |
| 2008/0079839 A1 * | 4/2008 | Sung et al. .................... 348/345 |
| 2008/0095529 A1 * | 4/2008 | Hsu et al. ...................... 396/529 |
| 2008/0121784 A1 * | 5/2008 | Chang et al. ................ 250/208.1 |
| 2008/0297645 A1 * | 12/2008 | Lo et al. ........................ 348/340 |
| 2008/0299499 A1 * | 12/2008 | Shiraishi ....................... 430/322 |
| 2009/0195896 A1 * | 8/2009 | Tsai ............................... 359/819 |
| 2010/0110282 A1 * | 5/2010 | Lan et al. ...................... 348/374 |

FOREIGN PATENT DOCUMENTS
CN 101315454 A 12/2008
* cited by examiner

Primary Examiner — Rodney Fuller
Assistant Examiner — Linda B Smith
(74) Attorney, Agent, or Firm — Altis Law Group, Inc.

(57) ABSTRACT

An exemplary camera module array includes lens modules, a first holder, image sensors, a second holder, an optical element, and an image processor. The lens modules are threadedly coupled to the first holder. The image sensors are in optical alignment with the lens modules in one-to-one relation. The image sensors are received in the second holder. The optical element is sandwiched between the first holder and the second holder. The image processor is electrically connected with the image sensors. The image processor is configured for processing image signals from the image sensors and thereby obtaining a compound image.

14 Claims, 4 Drawing Sheets

CAMERA MODULE ARRAY FOR OBTAINING COMPOUND IMAGES

BACKGROUND

1. Technical Field

The present disclosure relates to optical imaging, and particularly to a camera module array for obtaining compound images (e.g., stereo images).

2. Description of Related Art

Camera modules are in widespread use nowadays. In order to provide multifunctional features such as the ability to capture stereo (three-dimensional) images, etc, a camera module array including a plurality of camera modules is used. However, the camera module array generally has a complex structure, and it can be troublesome to assemble the camera module array.

Therefore, a new camera module array is desired to overcome the above-mentioned problems.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Various embodiments will now be described in detail below with reference to the drawings.

Figure 1:
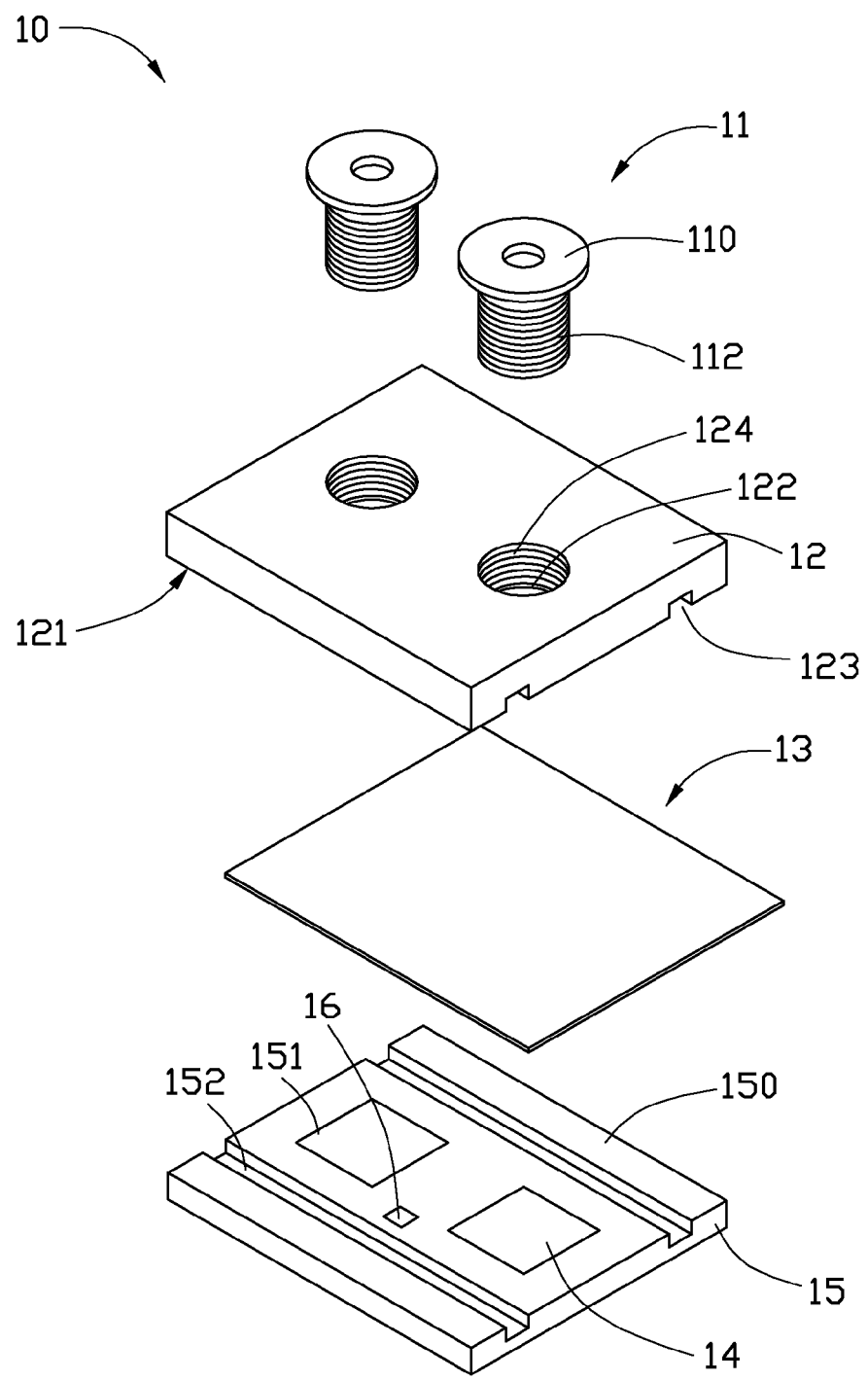
FIG. 1 is an exploded, isometric view of a camera module array in accordance with a first embodiment of the present disclosure.
Figure 2:
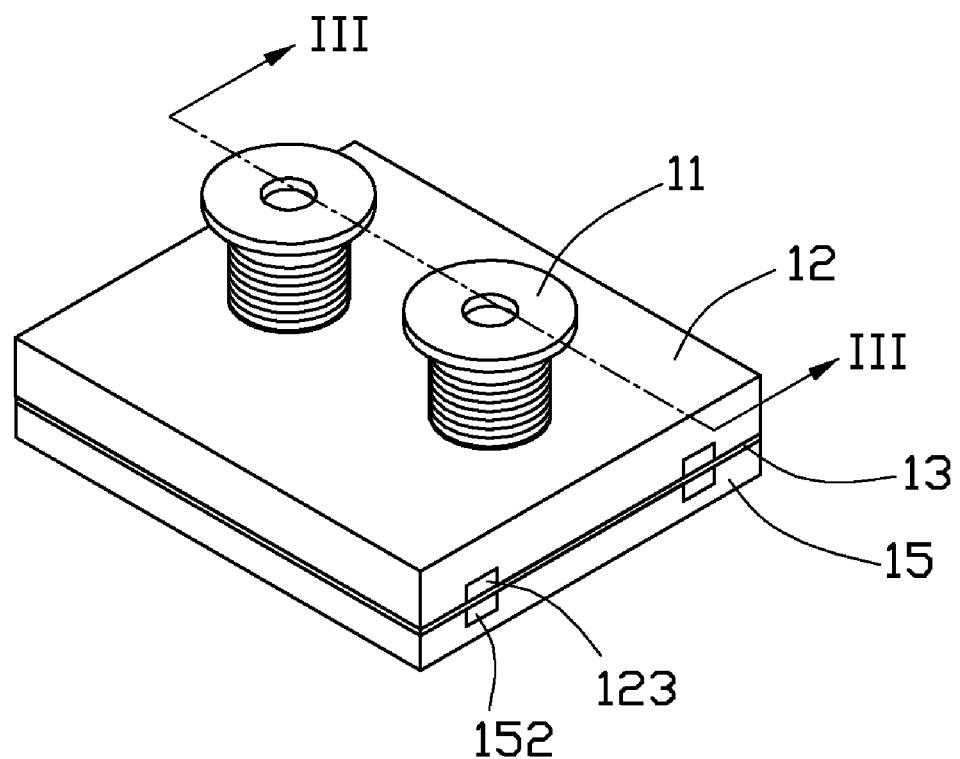
FIG. 2 is an assembled view of the camera module array of FIG. 1.
Figure 3:
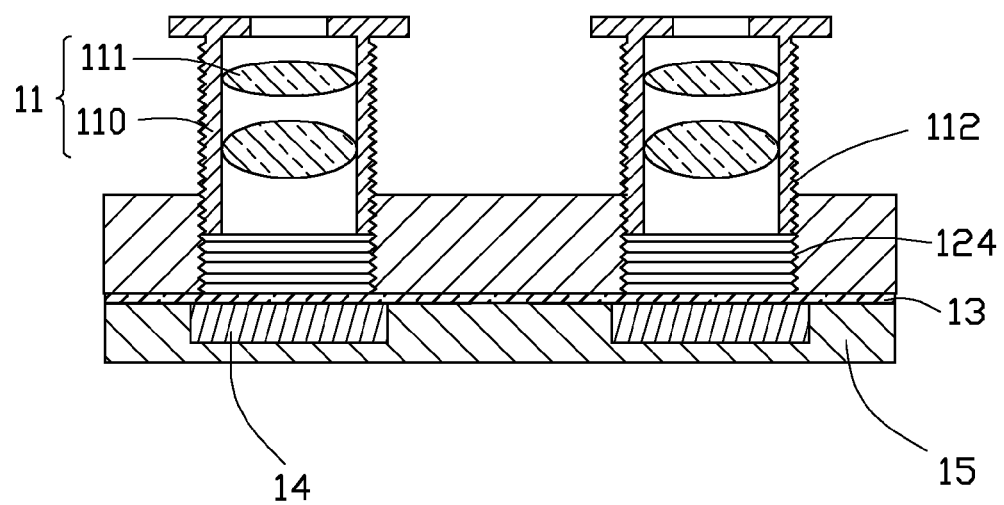
FIG. 3 is a cross-sectional view of the camera module array of FIG. 2, taken along a line III-III thereof.

Referring to FIGS. 1-3, a camera module array 10 according to a first embodiment of the present disclosure is shown. The camera module array 10 includes two lens modules 11, a first holder 12, an optical element 13, two image sensors 14, a second holder 15, and an image processor 16.

Each lens module 11 includes a barrel 110, and a plurality of lenses 111 received in the barrel 110. The barrel 110 includes an external screw thread 112 formed on an outer surface thereof. The two lens modules 11 have an identical focal length. Alternatively, the two lens modules 11 can have different focal lengths.

The first holder 12 includes a first surface 121 facing toward the second holder 15, two through holes 122, and two glue trenches 123 defined in the first surface 121. Each through hole 122 has an internal screw thread 124 formed on inner wall thereof. The two glue trenches 123 are straight and parallel to each other, and are configured for receiving glue (i.e., adhesive). The lens modules 11 are threadedly coupled to the first holder 12 by the external screw threads 112 and the internal screw threads 124.

The optical element 13 is sandwiched between the first holder 12 and the second holder 15. The optical element 13 is adhered to the first holder 12 via the glue in the glue trenches 123. In the present embodiment, the optical element 13 is a transparent cover glass. The optical element 13 protects the image sensor 14 from dust and other contamination. It is to be understood that, in further or alternative embodiments, the optical element 13 can be an optical filter. For example, the optical element 13 can include two optical regions corresponding to the two lens modules 11. The two optical regions allow light of two different central wavelengths (e.g., selected from red light, green light, and blue light) to pass therethrough.

The second holder 15 includes a second surface 150 facing toward the first holder 12, two glue trenches 152 defined in the second surface 150, and two recesses 151 also defined in the second surface 150. The two glue trenches 152 are parallel to each other, and are configured for receiving glue. In the present embodiment, the two glue trenches 152 have the same shape and size as the two glue trenches 123. The optical element 13 is attached to the second holder 15 via the glue in the glue trenches 152. The second holder 15 can be made of ceramic material.

The image sensors 14 are received in the recesses 151 of the second holder 15. Each image sensor 14 is in optical alignment with a respective lens module 11. The image sensors 14 are configured for producing image signals.

The image processor 16 is electrically connected with the two image sensors 14. The image processor 16 is for analyzing and processing the image signals from the image sensors 14, and thus obtaining a compound image or images (e.g., a stereo or 3D image).

In the present embodiment, the first holder 12, the second holder 15 and the optical element 13 are each rectangular in shape. It is to be understood that in other embodiments, the first holder 12, the second holder 15 and the optical element 13 can be other shapes, such as circular, elliptical, and so on.

Figure 4:
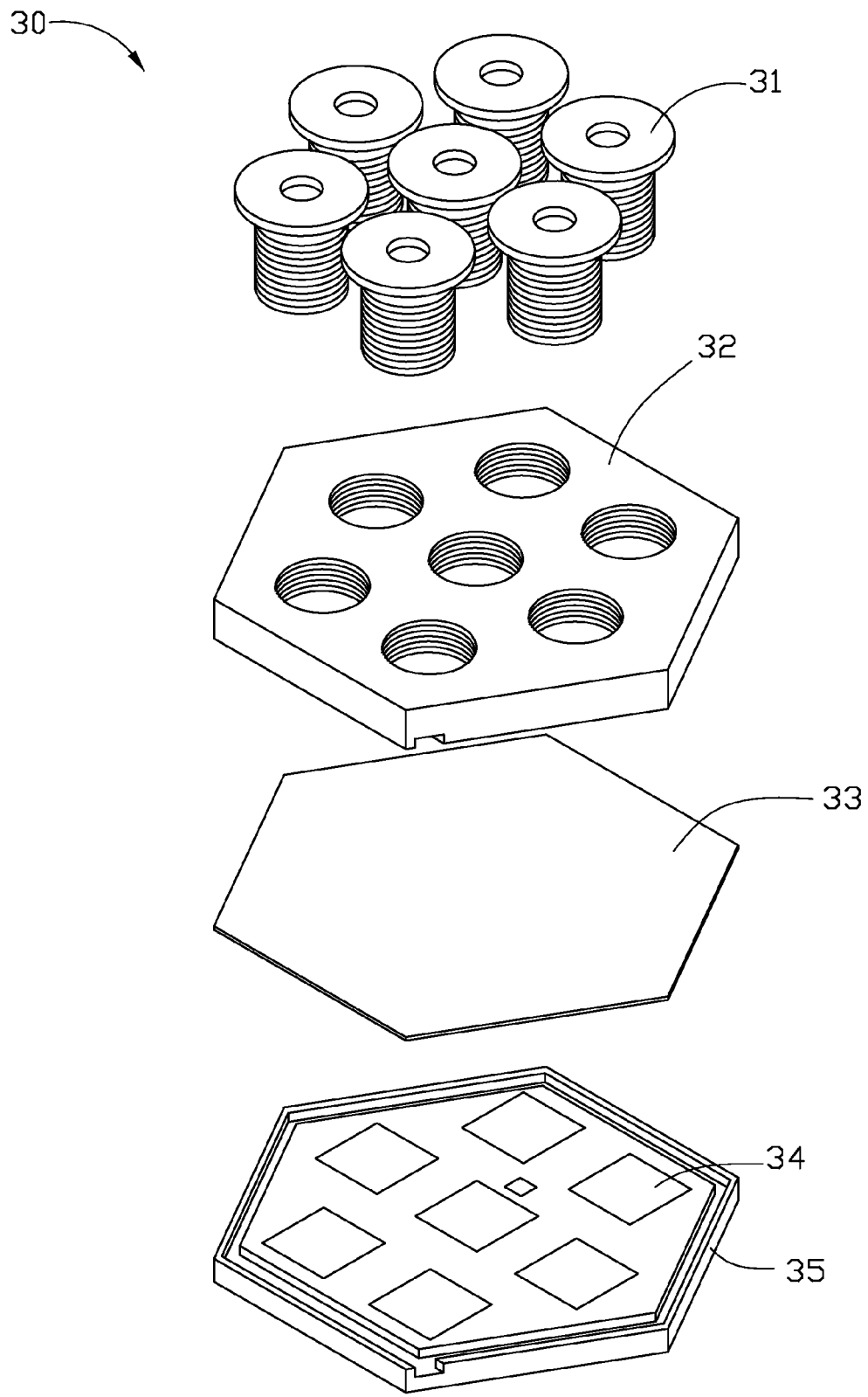
FIG. 4 is an exploded, isometric view of a camera module array in accordance with a second embodiment of the present disclosure.

Referring to FIG. 4, a camera module array 30 according to a second embodiment of the present disclosure is shown. The camera module array 30 is similar in principle to the camera module array 10 of the first embodiment. However, the total number of lens modules 31 and image sensors 34 differs, and the shapes of a first holder 32, a second holder 35 and an optical element 33 differ. The camera module array 30 includes seven lens modules 31 and seven image sensors 34. The first holder 32, the second holder 35 and the optical element 33 are each hexagonal in shape. In particular, the seven lens modules 31 are arranged in a regular hexagonal array with one of the lens modules 31 in the middle. The first holder 32, the second holder 35 and the optical element 33 have regular hexagonal shapes.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. A camera module array comprising:
a plurality of lens modules comprising seven lens modules, which are arranged in a regular hexagonal array with one of the lens modules in the middle, each lens module comprising a lens barrel and at least one lens received in the lens barrel;
a first holder, the lens barrels of the lens modules being threadedly coupled to the first holder;
a plurality of image sensors in optical alignment with the lens modules in one-to-one relation;

a second holder, the image sensors being received in the second holder;

an optical element sandwiched between the first holder and the second holder, the first holder, the second holder and the optical element each being regular hexagonal in shape; and an image processor electrically connected with the image sensors, the image processor being configured for processing image signals from the image sensors, and, accordingly, obtaining a compound image based on the image signals.

2. The camera module array of claim 1, wherein the first holder comprises a plurality of through holes defined therein, and each lens module is engaged in a corresponding through hole.

3. The camera module array of claim 1, wherein the first holder comprises a first surface facing toward the second holder, the first surface comprises at least one glue trench defined therein, and the at least one glue trench has adhesive received therein.

4. The camera module array of claim 1, wherein the second holder comprises a second surface facing toward the first holder, the second surface comprises at least one glue trench defined therein, and the at least one glue trench has adhesive received therein.

5. The camera module array of claim 1, wherein the optical element comprises a cover glass.

6. The camera module array of claim 1, wherein the optical element comprises a filter.

7. The camera module array of claim 1, wherein the second holder comprises a second surface facing toward the first holder, the second surface defines a plurality of recesses therein, and the recesses receive the image sensors therein.

8. The camera module array of claim 1, wherein the lens modules have different focal lengths.

9. The camera module array of claim 1, wherein the lens modules have the same focal length.

10. The camera module array of claim 1, wherein the first holder, the second holder and the optical element are each rectangular in shape.

11. The camera module array of claim 3, wherein the at least one glue trench is straight.

12. The camera module array of claim 4, wherein the at least one glue trench is straight.

13. The camera module array of claim 6, wherein the optical element comprises a plurality of optical regions corresponding to the lens modules, and the optical regions are configured to allow light of different central wavelengths to pass therethrough, respectively.

14. A camera module array comprising:

seven lens modules arranged in a regular hexagonal array with one of the lens modules in the middle;

a first holder being regular hexagonal in shape, the lens modules being threadedly coupled to the first holder;

a plurality of image sensors in optical alignment with the lens modules in one-to-one relation;

a second holder being regular hexagonal in shape, the image sensors being received in the second holder;

an optical element sandwiched between the first holder and the second holder, the optical element being regular hexagonal in shape; and an image processor electrically connected with the image sensors, the image processor being configured for processing image signals from the image sensors, and, accordingly, obtaining a compound image based on the image signals.

* * * * *